(12) United States Patent
Dursun et al.

(10) Patent No.: US 11,454,357 B2
(45) Date of Patent: *Sep. 27, 2022

(54) MULTIFUNCTIONAL LIGHT, DATA DEVICE, OR COMBINATION AND SYSTEMS

(71) Applicant: KING ABDULLAH UNIVERSITY OF SCIENCE AND TECHNOLOGY, Thuwal (SA)

(72) Inventors: Ibrahim Dursun, Thuwal (SA); Chao Shen, Thuwal (SA); Osman M. Bakr, Thuwal (SA); Tien Khee Ng, Thuwal (SA); Boon Ooi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 45 days.

This patent is subject to a terminal disclaimer.

(21) Appl. No.: 16/891,621

(22) Filed: Jun. 3, 2020

(65) Prior Publication Data
US 2020/0332968 A1 Oct. 22, 2020

Related U.S. Application Data

(63) Continuation of application No. 16/098,575, filed as application No. PCT/IB2017/052442 on Apr. 27, 2017, now Pat. No. 10,711,952.
(Continued)

(51) Int. Cl.
*H01L 25/16* (2006.01)
*F21K 9/64* (2016.01)
(Continued)

(52) U.S. Cl.
CPC .............. *F21K 9/64* (2016.08); *C09K 11/025* (2013.01); *C09K 11/665* (2013.01);
(Continued)

(58) Field of Classification Search
CPC .............. H01L 51/5278; H01L 51/502; H01L 51/0037; H01L 51/0003; H01L 51/0008;
(Continued)

(56) References Cited

U.S. PATENT DOCUMENTS 10,424,696 B2 * 9/2019 Lee ................. H01L 33/505
10,711,952 B2 * 7/2020 Dursun ............ C09K 11/665
(Continued)

FOREIGN PATENT DOCUMENTS

| CN | 104388089 A | 3/2015 |
| CN | 104861958 A | 8/2015 |

(Continued)

OTHER PUBLICATIONS

Notice of Reasons for Refusal in corresponding/related JP Patent Application No. 2018-559829, dated Nov. 19, 2020.
(Continued)

*Primary Examiner* — Don K Wong
(74) *Attorney, Agent, or Firm* — Patent Portfolio Builders PLLC

(57) ABSTRACT

Embodiments of the present disclosure provide devices and systems including a halide perovskite and/or phosphor to produce and/or communicate using visible light, and the like.

21 Claims, 8 Drawing Sheets

Related U.S. Application Data

(60) Provisional application No. 62/335,936, filed on May 13, 2016.

(51) Int. Cl.

| | | |
|---|---|---|
| *C09K 11/66* | (2006.01) | |
| *C09K 11/88* | (2006.01) | |
| *H05B 33/14* | (2006.01) | |
| *C09K 11/02* | (2006.01) | |
| *H04B 10/116* | (2013.01) | |
| *F21Y 115/30* | (2016.01) | |
| *F21Y 115/10* | (2016.01) | |
| *B82Y 20/00* | (2011.01) | |

(52) U.S. Cl.
CPC .......... *C09K 11/883* (2013.01); *H04B 10/116* (2013.01); *H05B 33/14* (2013.01); *B82Y 20/00* (2013.01); *F21Y 2115/10* (2016.08); *F21Y 2115/30* (2016.08)

(58) Field of Classification Search
CPC .............. H01L 51/4253; H01L 51/0026; H01L 51/006; H01L 51/0061; H01L 2031/0344; H01L 31/032; H01L 51/5016; H01L 25/167; H01L 2251/552; H01L 31/00; C09K 11/665; C09K 11/88; C09K 11/025; C09K 11/883; C09K 11/01; C07F 7/24; C07F 7/23; C01G 21/16; C01P 2002/34; C01P 2002/00; C23C 14/06; C23C 16/50; C07B 2200/13; Y02E 10/542; Y02E 10/549; F21K 9/64
See application file for complete search history.

(56) References Cited

U.S. PATENT DOCUMENTS

| | | | |
|---|---|---|---|
| 2017/0213813 A1 | 7/2017 | Rao et al. | |
| 2019/0093010 A1* | 3/2019 | Rand | .................. H01L 51/0077 |

FOREIGN PATENT DOCUMENTS

| | | |
|---|---|---|
| CN | 105390596 A | 3/2016 |
| EP | 2781574 A1 | 9/2014 |
| JP | 1902439 B2 | 3/2012 |
| JP | 4902439 B2 | 3/2012 |
| JP | 2013033916 A | 2/2013 |
| JP | 2014164906 A | 9/2014 |
| JP | 2019502272 A | 1/2019 |
| WO | 2009005377 A1 | 1/2009 |
| WO | 2016041838 A1 | 3/2016 |
| WO | WO-2016151535 A1 * | 9/2016 ............... C01G 1/06 |
| WO | 2017077290 A1 | 5/2017 |

OTHER PUBLICATIONS

Swarnkar, A., et al., "Colloidal CsPbBr3 Perovskite Nanocrystals: Luminescence Beyond Traditional Quantum Dots," Angewandte Chemie International Edition, Nov. 6, 2015, vol. 54, pp. 15424-15428, Wiley-VCH Verlag GmbH & Co. KGaA, Weinheim, and Supporting Information.

Bai, Z., et al., "Halide Perovskite Quantum Dots: Potential Candidates for Display Technology," Science Bulletin, Sep. 18, 2015, vol. 60, No. 18, ppi 1622-1624, Springer.

Notification and Third-Party Submission of Information filed in corresponding/related JP Application No. 2018-559829, dated Jul. 6, 2020.

Protesescu, L., et al., "Nanocrystals of Cesium Lead Halide Perovskites (CsPbX3, X = Cl, Br and I): Novel Dptoelectronic Materials Showing Bright Emission with Wide Color Gamut," Nano Letters, Jan. 29, 2015, vol. 15, pp. 3692-3696, American Chemical Society.

Zhang, F., et al., "Brightly Luminescent and Color-Tunable Colloidal CH3NH3PbX3 (X = Br, I, Cl) Quantum Dots Potential Alternatives for Display Technology," ACS Nano, Mar. 30, 2015, vol. 9, No. 5, pp. 4533-4542, American Chemical Society.

International Search Report in related International Application No. PCT/IB2017/052442, dated Aug. 31, 2017.

Kondo, S., et al., "Stimulated Emission from Microcrystalline CsPbBr3 Films: Edge Emission Versus Surface Emission," Materials Science and Engineering B, Feb. 7, 2007, vol. 137, Nos. 1-3, pp. 156-161.

Li, X., et al., "CsPbX3 Quantum Dots for Lighting and Displays: Room-Temperature Synthesis, Photoluminescence Superiorities, Underlying Origins and White Light-Emitting Diodes," Advanced Functional Materials, Apr. 1, 2016, vol. 26, No. 15, pp. 2435-2445.

Written Opinion of the International Searching Authority in related International Application No. PCT/IB2017/052442, dated Aug. 31, 2017.

Second/Final Notice of Reasons for Rejection in corresponding/related Japanese Patent Application No. 2018-559829, dated May 13, 2021.

Notice of Preliminary Rejection in corresponding/related Korean Application No. 10-2018-7036146, dated Sep. 16, 2021.

* cited by examiner

MULTIFUNCTIONAL LIGHT, DATA DEVICE, OR COMBINATION AND SYSTEMS

CROSS-REFERENCE TO RELATED APPLICATIONS

This application is a continuation of U.S. patent application Ser. No. 16/098,575, filed on Nov. 2, 2018, which is a U.S. National Stage Application of International Application No. PCT/162017/052442, filed on Apr. 27, 2017, which claims the benefit of and priority to U.S. Provisional Application Ser. No. 62/335,936, having the title "MULTIFUNCTIONAL LIGHT AND DATA DEVICE AND SYSTEM" filed on May 13, 2016, the disclosures of which are incorporated herein by reference in their entirety.

BACKGROUND

The annual report of the Directorate General for Energy of the European Commission estimated a 30% increase of the global energy demand by 2030. Out of all the current building electricity consumption, 20% goes for lighting. Thus, it became of paramount importance to find innovative lighting solutions that are multifunctional and more efficient. In the area of multifunctional devices, especially promising those that can combine lighting and data transfer. The demand for communication systems and data transfer, especially wireless technologies, is expected to grow at an exponential rate over the next decade. Existing technologies cannot keep up with the surging demand because of their crowded spectra and limited bandwidth.

SUMMARY

Embodiments of the present disclosure provide devices and systems including a material including a halide perovskite and/or phosphor to produce and/or communicate using visible light, and the like.

In an aspect, a device of the present disclosure, among other, includes: an excitation source and a material including a halide perovskite, a phosphor, or both, wherein the excitation source emits a first light energy, wherein the material absorbs the first light energy from the excitation source and emits a second light energy at a wavelength in the visible range, wherein the first light energy and the second light energy are at different wavelengths. In an embodiment, the halide perovskite can be $AMX_3$. A can be an organic or inorganic cation, and M can be a divalent cation selected from the group consisting of: Pb, Sn, Cu, Ni, Co, Fe, Mn, Pd, Cd, Ge, Cs, or Eu, where X can be selected from a halide. In an embodiment, the excitation source can be a blue laser diode or blue LED. In an embodiment, the phosphor can be selected from the group consisting of: oxides, nitrides, oxynitrides, sulfides, oxysulfides, selenides, halides, oxyhalides, silicates, aluminates, fluoride, phosphates, garnets and scheelites of cerium, dysprosium, erbium, europium, gadolinium, holmium, lanthanum, lutetium, neodymium, praseodymium, promethium, samarium, scandium, terbium, thulium, ytterbium and yttrium.

In an aspect, a system of the present disclosure, among others, includes: an excitation source that emits a first light energy, wherein modulation of the first light energy encodes a data set, and a material including halide perovskite nanocrystals, a phosphor, or both, wherein the material absorbs the first light energy from the excitation source and emits a second light energy at a wavelength in the visible range, wherein the second light energy encodes the data set. In an embodiment, a detector that receives the second light energy. In an embodiment, the data set is extracted from the received second light energy. In an embodiment, the data set can be received at about 1 to 3 Gbit/s.

Other compositions, methods, features, and advantages will be or become apparent to one with skill in the art upon examination of the following drawings and detailed description. It is intended that all such additional compositions, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

(FIG. 1A) ns-TA spectra of $CsPbBr_3$ NCs in toluene at the indicated delay times. Inset: (FIG. 1A) Absorption (pink) and PL (olive) spectra of $CsPbBr_3$ NCs in toluene, (FIG. 1B) Transient traces corresponding to the GSB from the ns-TA spectra of $CsPbBr_3$ NCs. (FIG. 1C) fs-TA spectra of $CsPbBr_3$ NCs. Inset kinetics in 0.0-5.5 ns time window. (FIG. 1D) ns-photoluminescence decay of $CsPbBr_3$ NCs monitored at 515 nm. The solid red lines are the best fits of the kinetic traces.

(FIG. 2A) Spectrum of white light generated using blue laser, green-emitting perovskite NCs and conventional nitride-based red phosphor. Inset: photographs of phosphor with perovskite under ambient light (right) and generated white light under blue laser (left). (FIG. 2B) Generated white light in the CIE 1931 color space (chromaticity coordinates). For a comparison, single crystal YAG phosphor and BBEHP-PPV+MEH-PPV (75:25) mixture phosphor are also plotted.

(FIG. 3A) Schematic drawing of the small-signal frequency-response measurement setup obtain results in 3B. (FIG. 3B) Measured frequency response of 1) blue LD, 2) laser diode together with phosphor-generated white light, where no optical filter is used 3) phosphor-converted green and red light, where a 500 nm long-pass filter is used; and 4) phosphor-converted red light, where a 550 nm long-pass filter is mounted. (FIG. 3C) Schematic of the data transmission measurement using an OOK scheme used to obtain results in 1D. (FIG. 1D) Bit-error-rates (BERs) at different data rates, with the forward error correction (FEC) limit labelled. Inset: eye diagram of 2 Gbit/s data rate showing with a clear open eye.

DETAILED DESCRIPTION

Figure 1A:
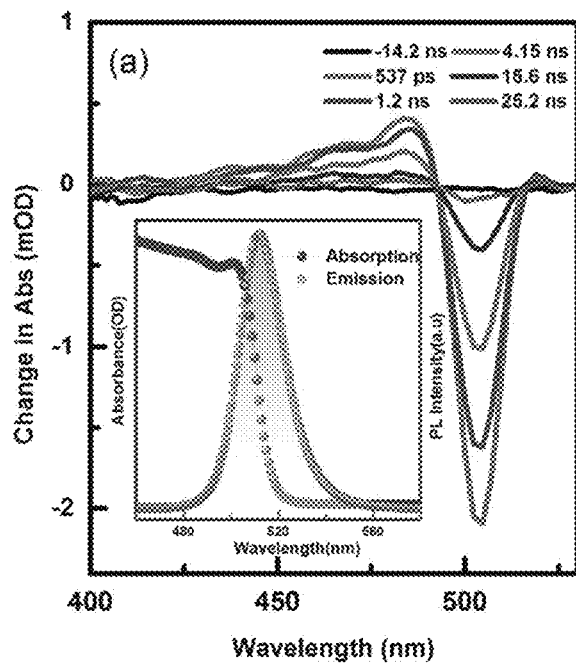
FIGS. 1A-1D illustrate carrier dynamics in $CsPbBr_3$.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, synthetic organic chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in bar. Standard temperature and pressure are defined as 25° C. and 1 bar.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

General Discussion

Embodiments of the present disclosure provide devices and systems including a material including a halide perovskite and/or phosphor to produce and/or communicate using visible light, and the like. Embodiments of the present disclosure provide devices and systems including a material including a halide perovskite and/or a phosphor to produce visible light and/or communicate using visible light.

Embodiments of the present disclosure include devices and systems can use the material of the present disclosure in white light for solid state lighting (SSL) in Liquid Crystal Display (LCD) backlighting system and in horticultural light emitting diodes (LEDs). In an embodiment, materials of the present disclosure can be used to produce a bright warm white light with high CRI and correlated color temperature, which are superior relative to other materials.

In another embodiment, materials of the present disclosure can be used to produce green and red lights with narrow Full Width at Half Maximum (FWHM) and high Photo Luminescence Quantum Yield (PLQY), which are superior for LCD backlighting. In another embodiment, materials of the present disclosure can be used to produce red light with broad FWHM and high PLQY in horticultural LEDs.

In another embodiment, devices and systems can use the materials in visible light communication (VLC, also referred to as Li-Fi), where data is present in the visible light emitted (uses visible light of about 400 to 800 THz (about 780-375 nm)) from the device or system and the transmission can be single or multichannel. In an embodiment, the VLC can be used in various types of electronics such as cell phones, communication devices, computers screens or monitors, computers, game consoles, interactive TV, traffic signals, light bulbs, toys, watches, clothing, digital cameras, incandescent and fluorescent lighting, and the like. In addition, an embodiment of the present disclosure can be used to communicate (e.g., transmit and/or receive) data using visible light communication.

In an embodiment, the device can include an excitation source and the material. In an embodiment, the excitation source is a light source such as a laser, a laser diode, LED or other light source that can operate in a manner desired for the specific application. In an embodiment, the wavelength of the laser can be selected so it is compatible with the material and can achieve the desired result. In this regard, the light source and the material are each selected to accomplish the desired results as described herein. In an embodiment, the light source is a blue laser diode or blue LED.

An embodiment of the present disclosure can include a white solid state lighting (SSL) device. In an embodiment, the SSL can include a LED (Light Emitting Diode). In an embodiment, the material can be disposed on an LED chip, where a power supply for the LED chip and other components normally used in a LED can be present. In addition, the LED can include the excitation source, such as a laser diode.

In an embodiment, the excitation source emits a first light energy that the material absorbs and then the material emits a second light energy at a wavelength(s) in the visible range. In an embodiment, the first light energy and the second light energy are at different wavelengths. In an embodiment, the second light energy is white light that has a color rendering index of about 80-90 and a correlated color temperature of about 2000-4000. In another embodiment, the second energy is green and red lights that has FWHM<35 nm and PLQY>80%. In another embodiment, the second is red light that has FWHM>35 nm and PLQY>60%.

In an embodiment, the material can include a halide perovskite having the formula $AMX_3$ and/or a phosphor. In an embodiment, the halide perovskite can have the following formula: $AMX_3$. In an embodiment, A can be a monovalent cation such as alkyl-ammonium (e.g., methylammonium (MA)), formamidinium (FA), 5-ammoniumvaleric acid, or an inorganic cation such Cesium (Cs), or a combination thereof. In an embodiment, M can be a cation or divalent cation of an element such as Pb, Sn, Cu, Ni, Co, Fe, Mn, Pd, Cd, Ge, Cs, or Eu. In a particular embodiment, M is Pb. In an embodiment, X can be a halide anion such as Cl, Br, F, and I. In an embodiment, each X can be the same, while in another embodiment, each X can be independently selected from a halide anion. In particular, X is I or Br or Cl. The selection of the components of $AMX_3$ is made so that the halide perovskite has a neutral charge. In an embodiment, alkyl can refer to linear or branched hydrocarbon moieties having one to six carbon atoms (e.g., methyl, ethyl, propyl, and the like).

In an embodiment, $AMX_3$ can be: methylammonium lead iodide ($MAPbI_3$), methylammonium lead bromide ($MAPbBr_3$), formamidinium lead bromide ($FAPbBr_3$), formamidinium lead iodide ($FAPbI_3$), $MAPbCl_3$, $MAPbBr_2Cl$, $FAPbCl_3$, $CsPbI_3$, $CsPbCl_3$, $CsPbBr_3$, $FASnBr_3$, $FASnBr_3$, and $FASnBr_3$, $MASnBr_3$, $MASnBr_3$, and $MASnBr_3$.

In an embodiment, the halide perovskite can be a nanocrystal having a diameter (or longest dimension) of about 3 to 20 nm, about 5 to 10 nm, about 7 to 9 nm, or about 8 nm. In an embodiment, it may be desirable to have halide perovskite nanocrystals in the range of 2 to 100 nm, and the halide perovskite nanocrystals can be fabricated according to the desired use or function.

In an embodiment, the halide perovskite can be mixed with the phosphor. In an embodiment the halide perovskite mixture with the phosphor can be encapsulated into polymer. In an embodiment, the halide perovskite can be disposed on a phosphor film or vice versa. In an embodiment, the ratio of the halide perovskite to the phosphor can be selected to achieve the desired wavelength emission, a high modulation bandwidth, and the like. In an embodiment, the ratio of the halide perovskite to the phosphor can be about 1:100 to 100:1 or about 1:10 to 10:1.

In an embodiment, the halide perovskite can be nanocrystals and can form microcrystalline film on a substrate (e.g., including the phosphor(s)). In an embodiment, the halide perovskite can be a single crystal halide perovskite, microcrystalline halide perovskites or a polycrystalline halide perovskite. In an embodiment, the halide perovskite can be doped.

In an embodiment, the polymer can be selected from: polyurethanes, latex rubbers, silicon rubbers, other rubbers, polyvinylchloride (PVC), vinyl polymers, polyesters, polyacrylates, polyamides, biopolymers, polyolefines, thermoplastic elastomers, styrene block copolymers, polyether block amid, and combinations thereof.

In an embodiment, the film on a substrate can have a thickness of about 5 to 1000 microns, about 100 to 500 micron, about 100 to 300 micron, or about 200 microns. In an embodiment, the length and width can be on the micron scale to cm scale or larger, and can be designed based on the particular use. In an embodiment, the halide perovskite can be a single crystal halide perovskite. In an embodiment, the halide perovskite can have cubic-shaped solids having a length, width, and height of about 5 to 10 microns.

In an embodiment, the halide perovskite film can be disposed on the substrate. In an embodiment, the substrate includes or is the phosphor (e.g., a phosphor film or substrate). In an embodiment, the substrate can have a thickness of about 0.001 to about 10 mm. In an embodiment, the length and width can be on the submicron scale to cm scale or larger, and can be designed based on the particular use.

An embodiment of the present disclosure includes a method of making a film or substrate including the phosphor and the halide perovskite. The method is simple, the component set up is not complex and does not require specialized equipment, the time of reaction is an order of magnitude shorter than other methods, and the reaction requires little energy input.

In an embodiment, the method of forming the halide perovskite includes dissolving $MX_2$ and AX in a solvent to form dissolved $APbX_3$ in a container at or near room temperature. The substrate and the solution are in a container so that the material can form on the substrate. In an embodiment, the solubility can be enhanced using a vortex mixer. In an embodiment, undissolved $MX_2$ or AX can be filtered out. In an embodiment, A can be an organic cation. In an embodiment, the concentration of the $MX_2$ can be about 4 to 44 weight %. In an embodiment, the concentration of the AX can be about 2 to 15 weight %.

In an embodiment, M can be selected from: Pb cation, Sn cation, Cu cation, Ni cation, Co cation, Fe cation, Mn cation, Pd cation, Cd cation, Ge cation, or Eu cation, Cs cation, and in a particular embodiment, M can be $Pb^{2+}$. In an embodiment, X can be a halide such as $Br^-$, $Cl^-$, or $I^-$. In an embodiment, A is a cation selected from methylammonium, formamidinium, and Cesium (Cs).

In an embodiment, the solvent can be N,N-dimethylformamide (DMF), dimethylsulfoxide (DMSO), gamma-butyrolactone (GBL), dichlorobenzene (DCB), N-methilformamide (NMF), aldehydes, ketones, organic acids, ethers, esters, alcohols, hydrocarbons (alkanes, alkenes, alkynes, aromatics etc.), halocarbons, or a combination thereof, depending upon the $AMX_3$ structure to be formed.

Subsequently, the mixture in the solvent is heated to a temperature (e.g., about 40 to 150° C.) so that the microcrystalline film (e.g., $APbX_3$ structure) forms, where the temperature corresponds to the inverse temperature solubility for dissolved microcrystalline film (e.g., $APbX_3$). In an embodiment, the $APbX_3$ structure can be formed in about 0.5-3 h.

In an embodiment, the solvent is matched with the reactants so that at room temperature the reactants are soluble in the solvent, but at higher temperatures, the $APbX_3$ structure is formed (e.g., crystalizes). In this regard, when a $MAPbBr_3$ perovskite structure is to be formed, the solvent used is N,N-dimethylformamide (DMF). In another embodiment, when a $MAPbI_3$ perovskite structure is to be formed, the solvent is γ-butyrolactone (GBL). In another embodiment, when a $MAPbCl_3$ perovskite structure is to be formed, the solvent is dimethylsulfoxide (DMSO) and DMF (1:1 ratio).

In an embodiment, the microcrystalline film (e.g., $APbX_3$ structure) can be doped by adding a dopant such as bismuth, gold, indium, tin germanium, phosphine, copper, strontium, cadmium, calcium, and/or nickel ions (2+ and 3+ cations as appropriate) to the reaction process by added these to the precursor solution. In an embodiment, the atomic of the dopant can be about 0.0001 to 5%.

Embodiments of the phosphor can include those known in the art. In an embodiment, the phosphor can include nitrides, oxynitrides, sulfides, oxysulfides, selenides, halides, oxyhalides, silicates, aluminates, fluoride, phosphates, garnets and scheelites of cerium, dysprosium, erbium, europium, gadolinium, holmium, lanthanum, lutetium, neodymium, praseodymium, promethium, samarium, scandium, terbium, thulium, ytterbium and yttrium, or quantum dots: CdSe, CdSe/ZnS, CdSe/ZnSe, CdSe/CdS, InP, InP/ZnS, InP/ZnSe, PbS, PbSe, CdTe, CdTe/ZnS, CdTe/CdSe, and the like, blends thereof that emit in the orange (e.g., about 590-635 nm), yellow (e.g., about 560-590 nm), red (e.g., about 635-700 nm), green (e.g., about 510-560 nm), blue (e.g., about 450-490 nm), cyan (e.g., about 490-510 nm), and violet (e.g., about 400-450 nm) wavelength range.

In an embodiment, the phosphors or blends of phosphors can be selected based on the halide perovskite, the desired wavelength emission, and optionally on data to be encoded (described in more detail below). In an embodiment, the selection of the phosphor and the halide perovskite can be done so that the material emits light in the visible wavelength range (and optionally encode data).

In an embodiment, the nitride phosphor can include those that emit light in the orange, yellow, red, green, blue, cyan, and violet, wavelength range. In an embodiment, the phosphor is a red-emitting nitride phosphor while the halide perovskite is $CsPbBr_3$. In an embodiment, the oxynitride phosphor can include those that emit light in the orange, yellow, red, green, blue, cyan, and violet, wavelength range. In an embodiment, the oxide phosphor can include those that emit light in the orange, yellow, red, green, blue, cyan, and violet, wavelength range. In an embodiment, the sulfide phosphor can include those that emit light in the orange, yellow, red, green, blue, cyan, and violet, wavelength range.

An embodiment of the present disclosure can include a system that can encode a data set using visible light energy. In an embodiment the system includes a visible light encoding system and optionally includes a data extracting system (and/or data set decoding system), where the data extracting feature can be part of the system or part of a separate system.

In an embodiment, the visible light encoding system can include an excitation source that emits a first light energy. In an embodiment, a data set can be encoded into the first light energy by modulating (e.g., modulation bandwidth of about 400 to 600 MHz, about 450 to 550 MHz, or about 491 MHz) the first light energy. In other words, the first light energy can be modulated over time and/or wavelength to represent the data set. For example, the first light energy can be modulated (e.g., turned on/off very fast) to represent "0" and "1" in a way to represent the first data set.

The first light energy is directed at the material including the halide perovskite having the formula $AMX_3$ and/or the phosphor. The material absorbs the first light energy from the excitation source and emits a second light energy at a wavelength(s) in the visible range, where the second light energy (e.g., as a function of time) encodes the data set. In an embodiment, the data set can be transmitted and/or received at about 0.1 to 5 Gbit/s or about 1 to 3 Gbit/s or to greater than about 3 Gbit/s. In an embodiment, the second light energy is white light that has a color rendering index of about 80-90 and a correlated color temperature of about 2000-4000.

In an embodiment, the data extracting system can include a detector that receives the second light energy. In an embodiment, the detector (e.g., photodiode or array of photodiodes) can decode the first data set. In an embodiment, the detector can be in communication with a decoding system (e.g., a computer or software system) that can decode the second light energy. The data extraction system can be in communication with other systems that can extract and/or otherwise use the data, for example, a communication device like a cell phone, a computer, or the like.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

In this disclosure, we investigate the fast and predominantly radiative recombination characteristics of $CsPbBr_3$ perovskite nanocrystals (NCs) as a light converter for visible light communication (VLC) in addition to the generation of white light for solid state lighting (SSL). A record light converter-associated modulation bandwidth of 491 MHz was measured in our system, which is significantly greater than those of conventional nitride-based phosphors (3-12 MHz) and organic polymers (200 MHz). The light source generates bright warm white light with high CRI—as much as 89—and a correlated color temperature (CCT) of greater than 3200 K. To the best of our knowledge, this work reports the first VLC system with solution-processed perovskite NCs. This work breaks the bandwidth limitation barrier of phosphor-converted white light VLC systems and showcases a novel utilization of $CsPbBr_3$ perovskite NCs as efficient and effective alternative phosphor materials for VLC and SSL applications simultaneously.

Figure 4A:
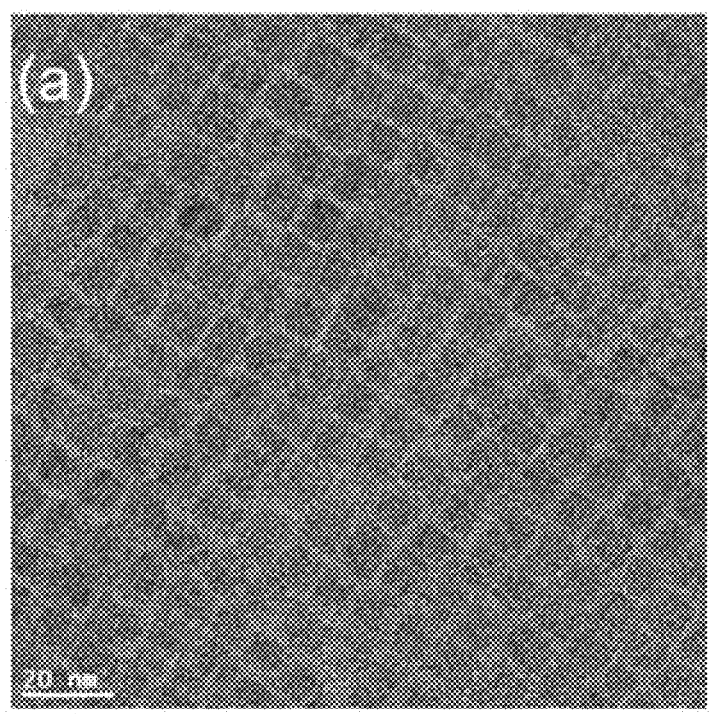
FIG. 4A is a high resolution transmission electron microscopy image of the $CsPbBr_3$ perovskite NCs.
Figure 4B:
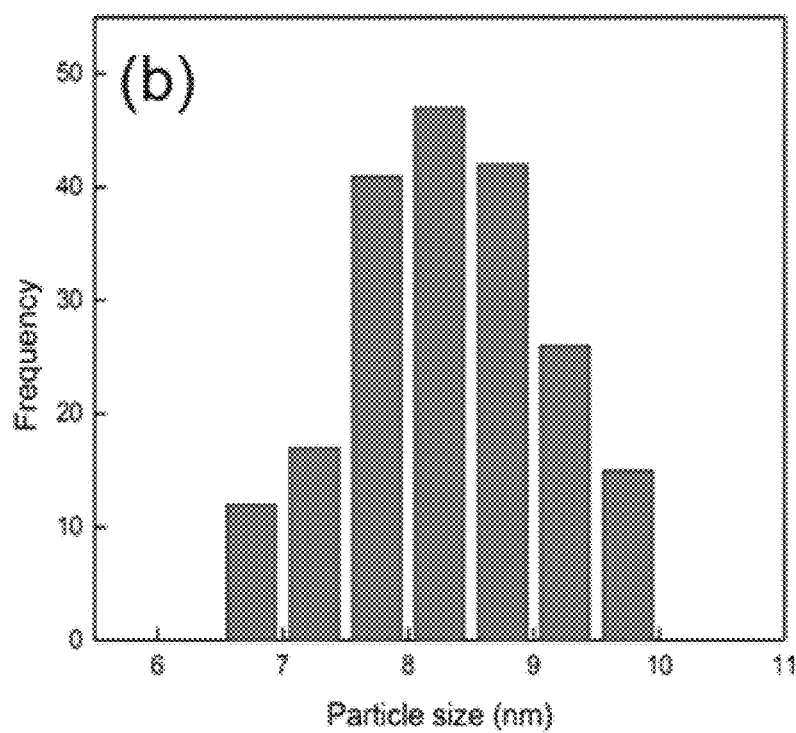
FIG. 4B is a size distribution histogram of $CsPbBr_3$ NCs.
Figure 5:
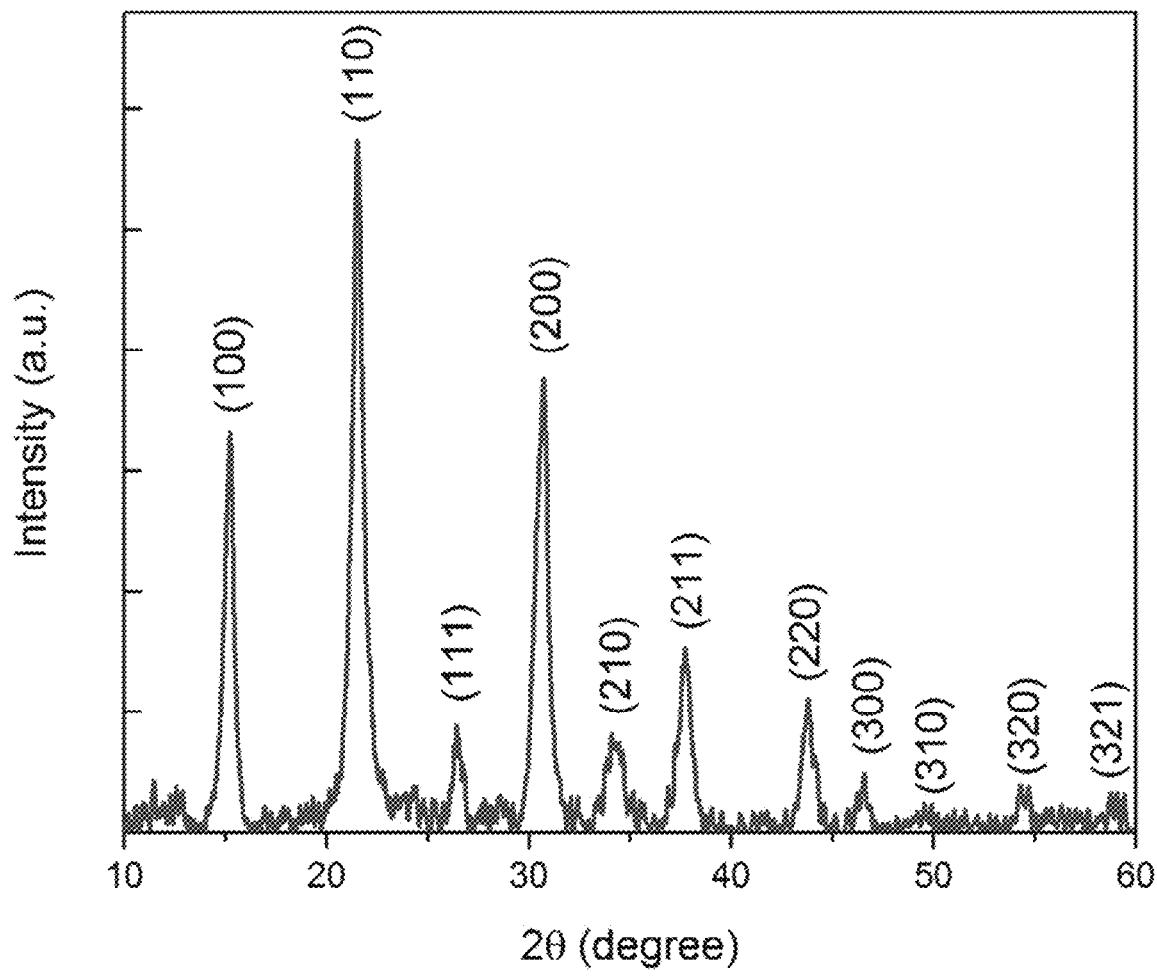
FIG. 5 shows the X-ray diffraction (XRD) spectrum of the NCs exhibited in the cubic $CsPbBr_3$ phase.

We synthesized $CsPbBr_3$ perovskite NCs via a modified hot-injection method similar to that presented in previous work (see the experimental section). The NCs were characterized by high resolution transmission electron microscopy (HRTEM) (FIGS. 4A-B), which revealed uniform cubic shaped NCs with an average size of 8.3±0.8 nm. The X-ray diffraction (XRD) pattern of the NCs exhibited the cubic $CsPbBr_3$ phase (see FIG. 5). FIG. 1A inset shows the absorption and photoluminescence (PL) spectra of the NCs dispersed in toluene. As can be seen, the absorption spectrum of the $CsPbBr_3$ NCs does not exhibit any spectral features at wavelengths longer than ~520 nm, which is consistent with previous reports. The NCs exhibit a sharp PL emission peak at 512 nm with a narrow full width at half maximum (FWHM) of 22 nm.

Figure 1B:
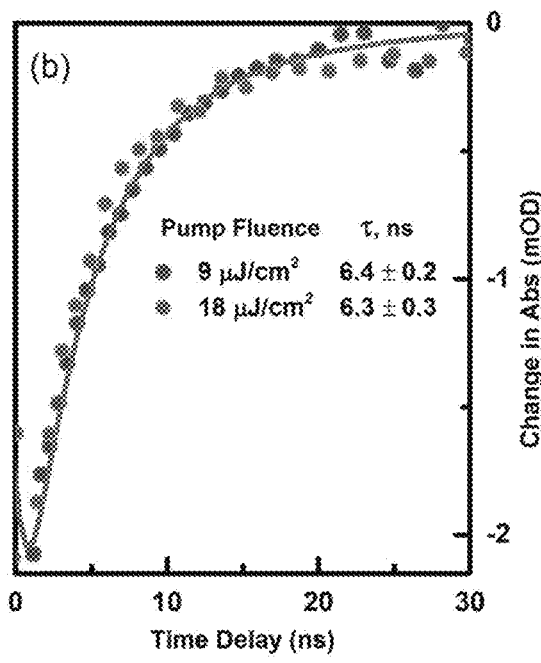

Time-resolved laser spectroscopy has proven to be a critical part of studying excited state dynamics. Here, to study the carrier dynamics of these $CsPbBr_3$ NCs, we performed femto-nanoseconds transient absorption (fs-ns-TA) experiments and time-resolved PL measurements and the results are presented in FIGS. 1A-D. The ns-TA measurement was recorded following laser pulse excitation at 350 nm with a pump fluence of 9 µJ/cm². In this TA experiment, we followed the ground-state bleach (GSB) recovery to monitor the charge recombination dynamics, as shown in FIG. 1A. The GSB observed at approximately 505 nm, which corresponds to the steady-state absorption spectrum, reveals a full recovery in a 30-ns time window with a time constant of 6.4 ns (shown in FIG. 1B). Because of the low pump intensity for photo-excitation, Auger recombination due to carrier multiplication generated by multi-photon absorption is not appreciable. To also confirm that a multiple exciton generation process is not dominant in the observed dynamics, we performed the TA experiments at two different pump fluencies (9 and 18 µJ/cm$^2$) and almost identical kinetics are recorded as shown in FIG. 1B.

Figure 1C:
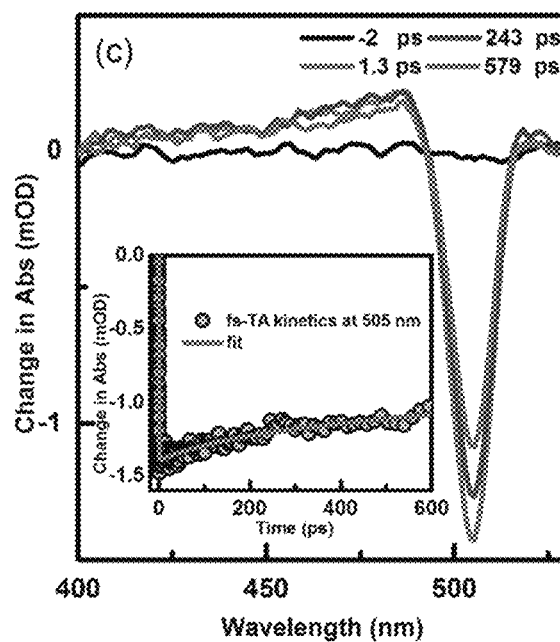
Figure 1D:
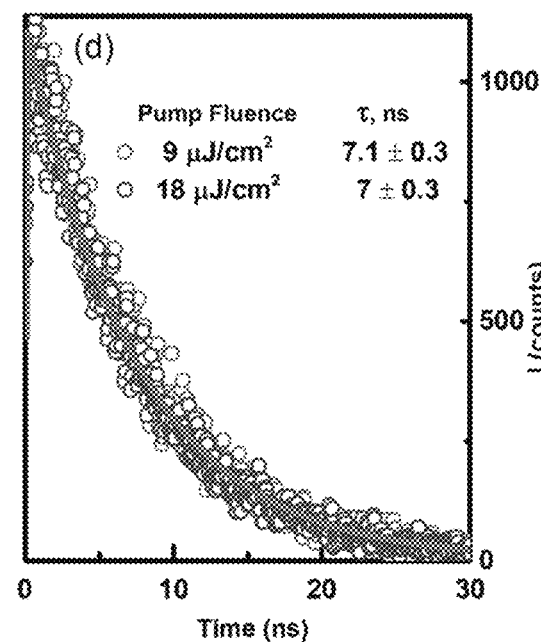
Figure 6A:
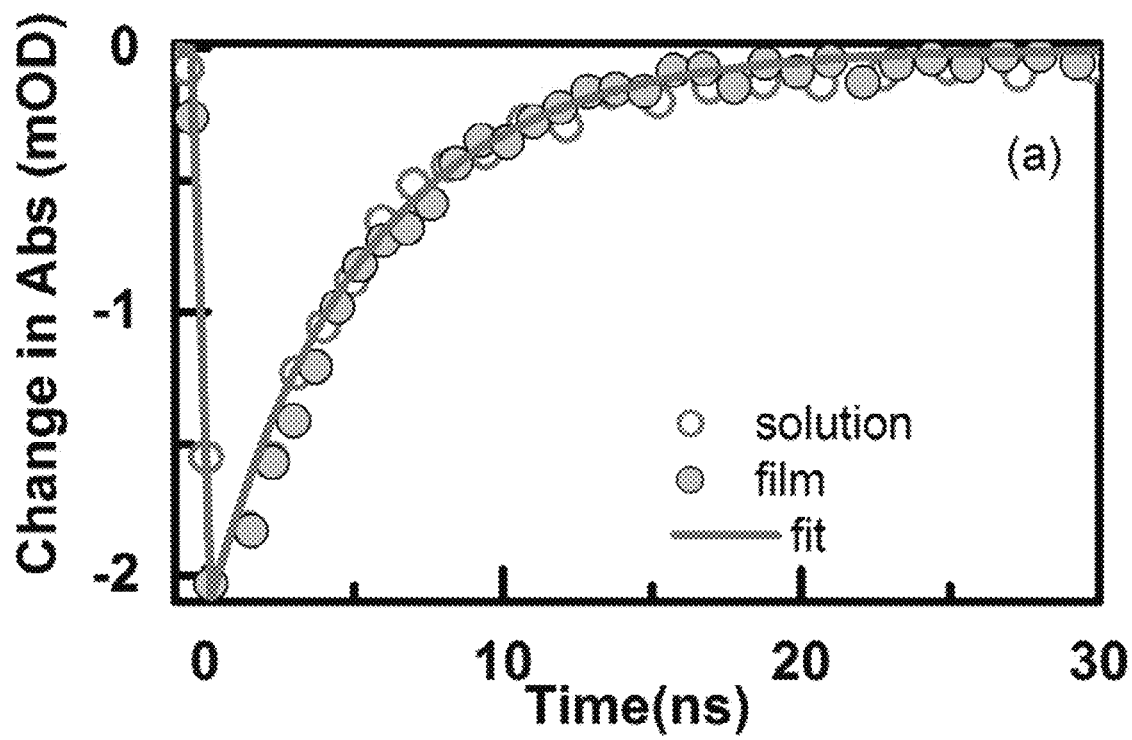
FIG. 6A shows transient absorption kinetics at 505 nm and FIG. 6B shows time-correlated single-photon counting for $CsPbBr_3$ NCs solution and film.
Figure 6B:
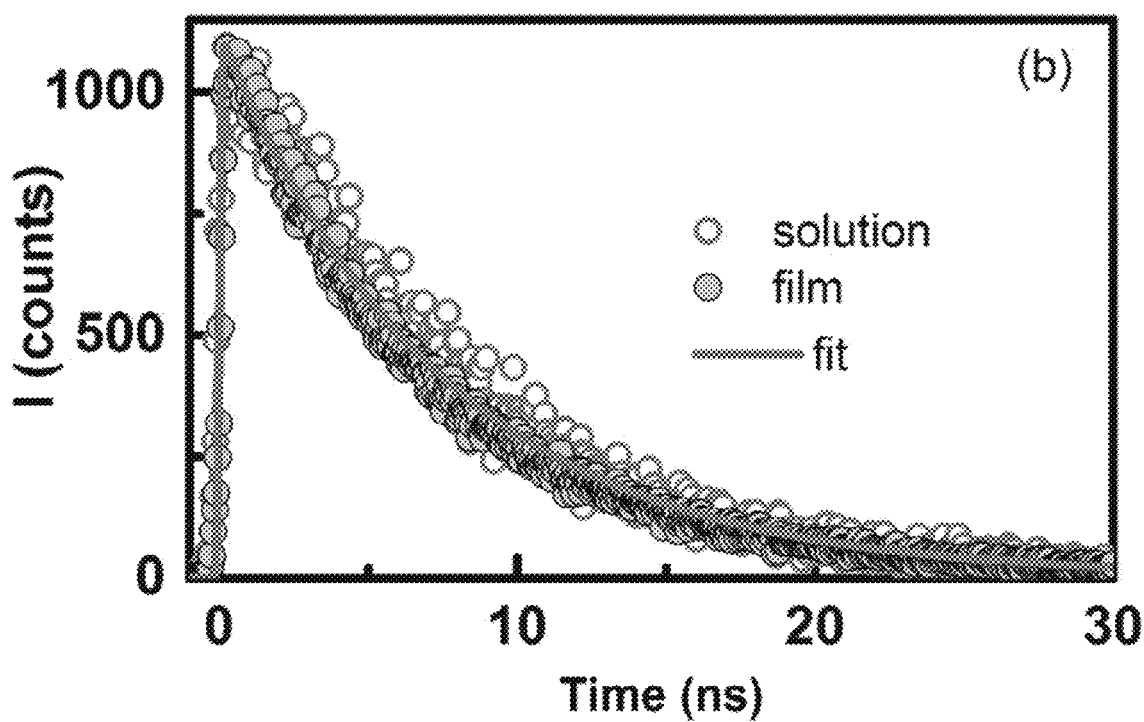

Additionally, we have performed the fs-TA of CsPbBr$_3$ NCs and the results are shown in FIG. 1C. The GSB recovery shows an additional component with a characteristic time constant of 103±40 ps which may be attributed to non-radiation recombination due to surface traps. To further understand the carrier dynamics and the radiative recombination process, we measured the PL lifetime via time-correlated single-photon counting (TCSPC) using a fluorescence up-conversion spectrometer with excitation at 400 nm (FIG. 1D). The PL lifetime decay profile was collected at 515 nm. The decay curve can be fitted with a single exponential function with a lifetime of approximately 7.0±0.3 ns. It is worth pointing out that the PL decay of CsPbBr$_3$ NCs with two different excitation fluencies shows a similar decay trend (see FIG. 1D), which is consistent with TA data. This short lifetime of about 7 ns is comparable with the reported values for similar sized of CsPbBr$_3$ NCs. We have also observed similar kinetics trend from both solution and film samples of CsPbBr$_3$ NCs in time-resolved experiments shown in FIGS. 6A-B. Because of their high PLQY of 70±10% and short radiative recombination lifetime of 7.0±0.3 ns, CsPbBr$_3$ NCs have promising candidates for generating VLC and SSL.

Figure 2A:
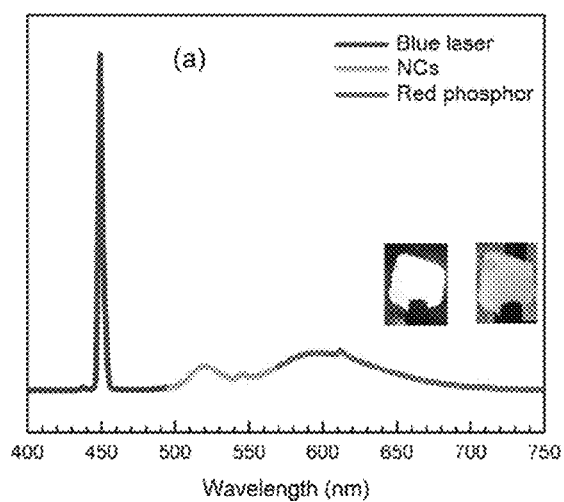
FIGS. 2A-2B show $CsPbBr_3$ perovskite nanocrystals for solid state lighting.
Figure 2B:
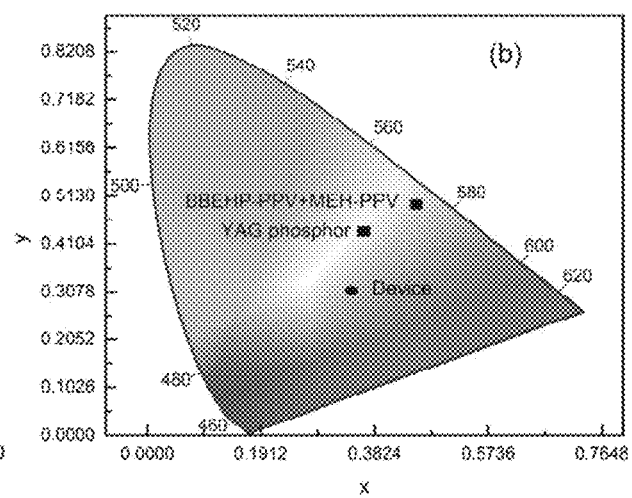

To study the white light generated by utilizing CsPbBr$_3$ NCs as light converters for SSL, a mixture of green-emitting CsPbBr$_3$ NCs phosphor with a red-emitting nitride phosphor (LAM-R-6237, Dalian Luming Group) (CsPbBr$_3$ NCscan be drop casted onto red-emitting phosphor in PDMS (Polydimethylsiloxane) or CsPbBr$_3$ NCs can be mixed with phosphor and then encapsulated in PDMS) is excited by a GaN blue-emitting LD ($\lambda$=450 nm) (see FIG. 2A inset). Operating at 200 mA, the LD generates a warm white light (CCT=3236 K) with a CRI value of 89, as calculated after its emission passes through the phosphor mixture. Compared with the warm white LED bulbs available on the market, which have a typical CRI of 70-80, the white light generated herein achieves higher quality emission that is suitable for lighting. FIGS. 2A-B show the spectrum and the chromaticity diagram (CIE 1931) coordinates (0.3823, 0.3079) of the generated white light. The CRI value of the CsPbBr$_3$ NCs with red-emitting phosphor is also greater than that reported value of 76 for organic down-converted white VLC transmitters. Our device also shows enhanced performance than commercial WLEDs based on YAG:Ce$^{3+}$ phosphor, which exhibit relatively low CRI (<75) and high CCT (>7765 K). The device using perovskite NCs phosphor as demonstrated in this work suggests better quality of white light. In comparison, our results present a higher CRI of 89 and a lower CCT of 3236 K, which are essential factors for indoor illuminations and optical display applications.

Figure 3A:
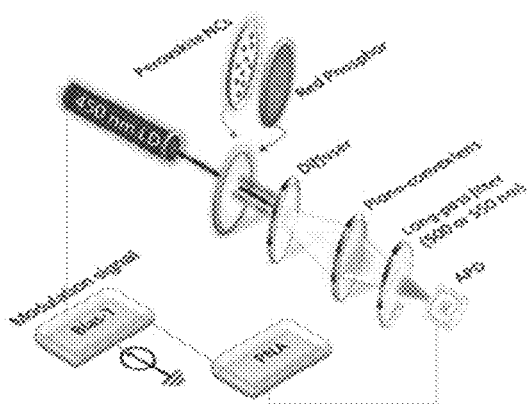
FIGS. 3A-D show modulation bandwidth and data transmission measurements using perovskite NCs.
Figure 3B:
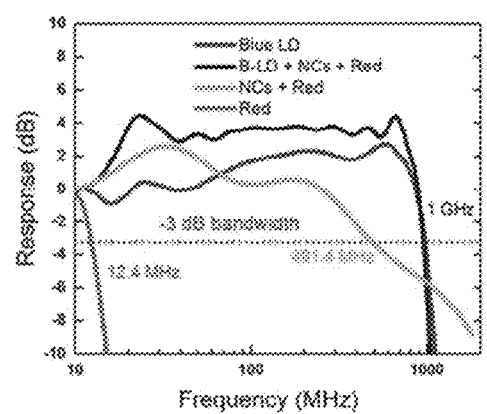
Figure 3C:
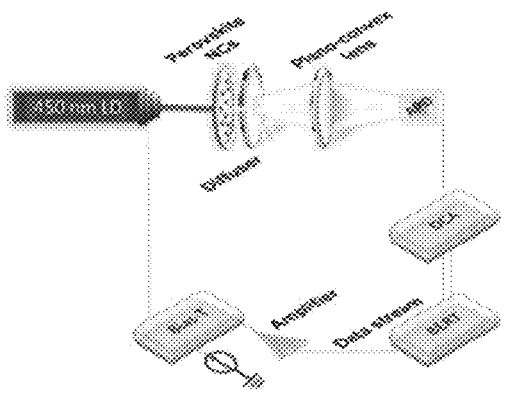
Figure 3D:
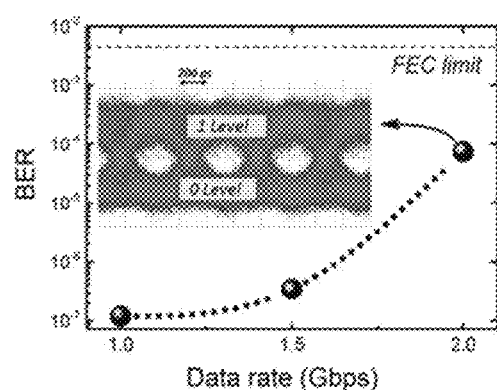

To investigate the modulation bandwidth in CsPbBr$_3$ NCs phosphor-converted white light, we performed a small-signal frequency-response measurement (FIG. 3A). A −10 dBm sinusoidal AC modulation signal was superimposed on a DC bias current to drive the LD. Both the laser emission and phosphor converted light are then collected by the photodetector. By sweeping the AC modulation frequency from 10 MHz to 2 GHz, the response of the overall system response including the phosphor-converted lighting system, is measured by comparing the transmitted signal and received signal. The modulation bandwidth of the blue LD (B-LD) was measured without phosphor and optical filters inserted. The frequency response of B-LD+NCs+red-phosphor, NCs+red-phosphor and red-phosphor only was measured by inserting no optical filter, 500 nm long-pass filter and 550 nm long-pass filter, respectively. Short recombination lifetime is the key parameter for VLC applications because the capacity of a communications channel is related to the bandwidth and lifetime. We posited that due to their desirable carrier recombination lifetimes, CsPbBr$_3$ NCs as light convertors have great potential for high modulation bandwidth devices and could overcome the current data transmission bottleneck in slow response (limited bandwidth) of conventional phosphor-converted WLED. Indeed, we found CsPb$_{r3}$ NCs phosphor-converted light exhibits a relatively high bandwidth of 491.4 MHz (FIG. 3B), which is significantly greater than those of conventional nitride-based phosphors (~12.4 MHz), organic materials (40-200 MHz), commercial YAG-based phosphors (3-12 MHz) and blue LEDs. In addition to these materials, colloidal quantum dots (CQDs) are also potential wavelength conversion materials for VLC. Leurand et. al. reported that CQDs (core-shell CdSe/ZnS) are capable to generate white light when excited by 450 nm blue LED; however, at a considerably low −3 dB bandwidth of 10~25 MHz as the carrier relaxation lifetime is considerably lower. Using the fast-response CsPbBr$_3$ NCs as a phosphor, we also demonstrated the data transmission of phosphor-converted LD-based VLC using an on-off keying (OOK) modulation scheme. The OOK is the basic form of amplitude shift keying modulation scheme for wireless communication, where the presence or absence of carrier wave represents the ones and zeros of digital data, respectively. A pseudorandom binary sequence (PRBS) $2^{10}$-1 data-format was used to modulate the laser intensity, thus transmitting data in a wireless manner. The schematic of the data transmission measurement by OOK is illustrated in FIG. 3C. The CsPbBr$_3$ NCs were deposited on a plastic diffuser to serve as a phosphor. The bit-error-rates (BERs) at variable data rates are demonstrated in FIG. 3D, where a BER of 7.4×10$^{-5}$ is measured at 2 Gbit/s. The obtained BER measurement adheres to the forward error correction (FEC) standard (BER≤3.8×10$^{-3}$). The clear open eye as observed in the eye diagram (inset of FIG. 3D) suggests that the CsPbBr$_3$ NCs phosphor-converted LD VLC is capable of transmitting a high data rate of up to 2 Gbit/s.

In conclusion, we have demonstrated the CsPbBr$_3$ NCs' potential to serve as fast color converters for VLC and SSL by mixing them with a red-emitting nitride phosphor. The direct radiative recombination and short PL lifetime of CsPbBr$_3$ perovskite NCs enabled us to utilize them as phosphors for dual-function VLC and SSL systems. Because of the short recombination lifetime of CsPbBr$_3$ NCs (relative to conventional phosphor-based materials), the converted white light (with a high CRI of 89 and a low CCT of 3236 K) exhibits an extraordinary modulation bandwidth of 491 MHz, which is 40 times greater than that of conventional phosphors. The fast response and desirable color characteristics of CsPbBr$_3$ NCs as a phosphor material pave the way for a new generation of dual-function systems for VLC and SSL with high brightness and a high Gbit/s data transfer rates.

Example 2

Figure 7A:
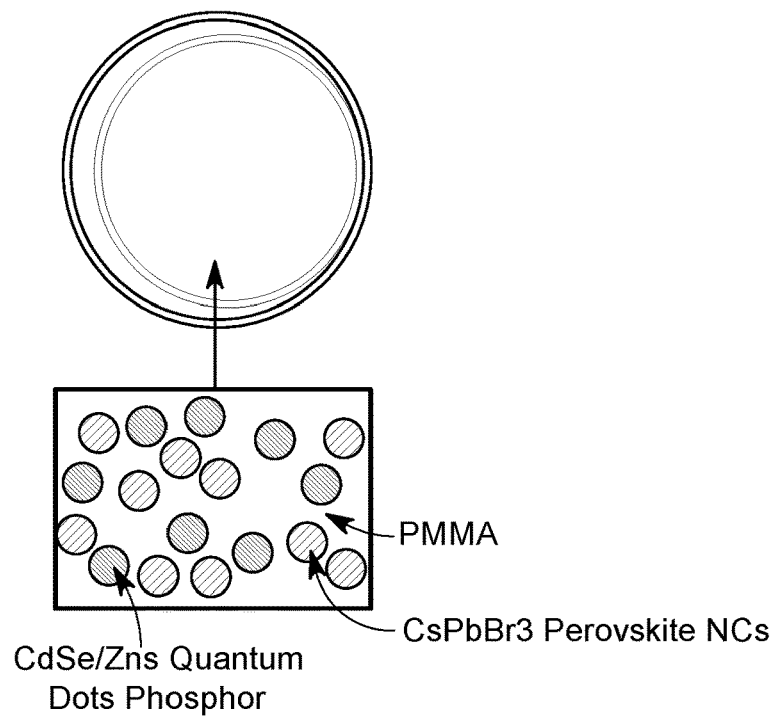
FIG. 7A shows a photo of the material including $CsPbBr_3$ perovskite nanocrystals with CdSe/ZnS Quantum Dots phosphor encapsulated in PMMA.

The mixture of CsPbBr$_3$ perovskite nanocrystals and CdSe/ZnS quantum dots phosphor encapsulated in PMMA polymer was fabricated. FIG. 7A shows a photo of the material that includes green emissive CsPbBr$_3$ NCs and red emissive CdSe/ZnS Quantum Dots Phosphor that are distributed in the polymer. The PL spectra includes two peaks, the emission of green light centers at 510 nm with FWHM=20 nm, the red emission centers at 620 nm with FWHM=34 nm. The PLQY of the film is 83%.

Figure 7B:
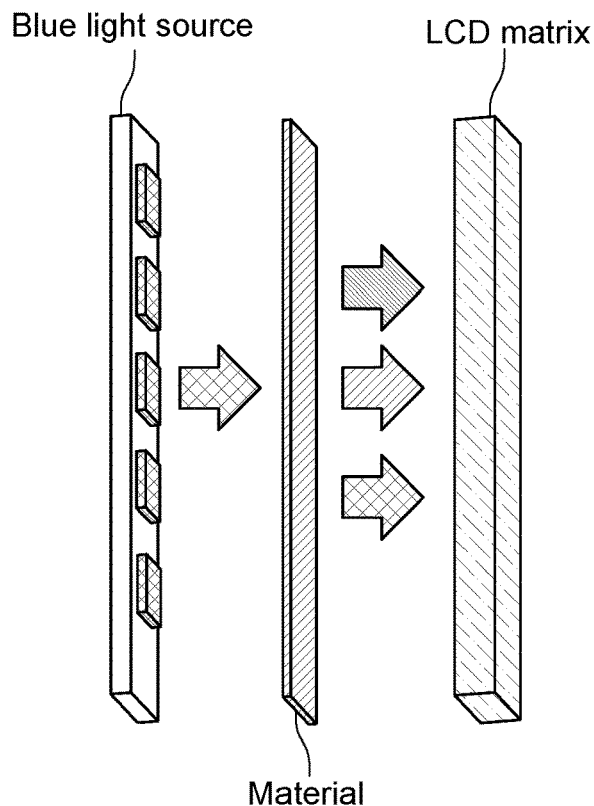
FIG. 7B shows a light conversion of blue light into green and red lights by the material that can be used in LCD backlighting.

Because of narrow FWHM (<35 nm) and high PLQY (>80%), this material can be used for LCD backlighting, where it converts blue light from an external source (blue laser or blue LED) into green and red colors. Resulting RGB lights can be directed into LCD matrix to produce a display image (FIG. 7B). The advantage of using the present material for LCD backlighting is that it can increase brightness and contrast, wider color gamut of the display images because of narrow FWHM. Also the material will lead to decrease of energy consumption of LCD display because of high PLQY.

Example 3

Figure 8A:
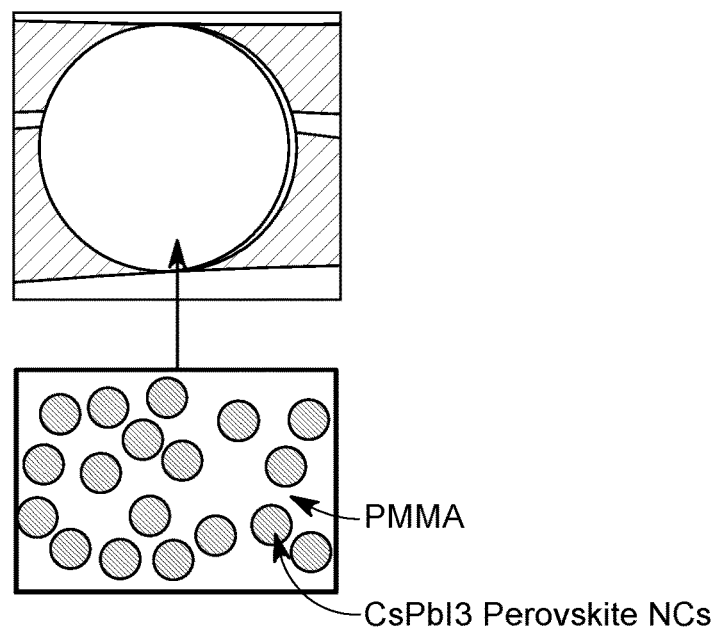
FIG. 8A shows a photo of the material including $CsPbI_3$ perovskite nanocrystals encapsulated in PMMA.

We fabricated the polymer film containing CsPbI$_3$ perovskite nanocrystals in PMMA (FIG. 8A). The PL spectrum includes 1 emission peak that centers at 660 nm, having FWHM=37% and PLQY=68%.

Figure 8B:
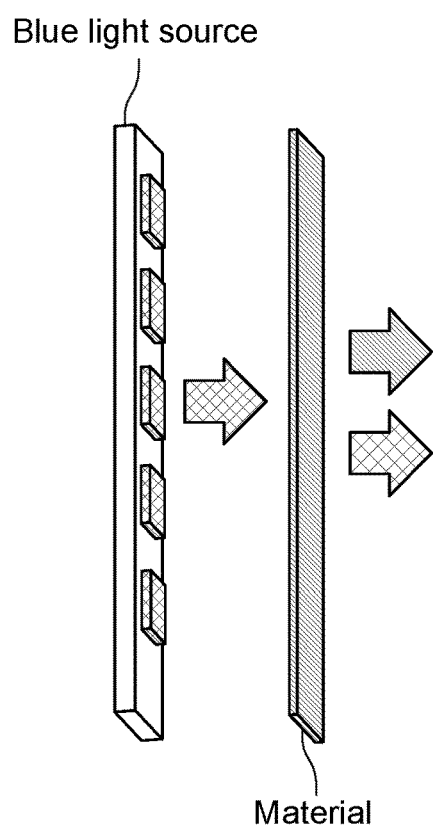
FIG. 8B shows a light conversion of blue light into red light by the material that can be used in horticultural LED.

This material can be used for the horticultural LED, where it converts blue light from an external source (blue laser or blue LED) into red light (FIG. 8B). The device includes blue LED and the present material generates blue and red lights that are optimal for growing different plants and crops. Chlorophyll, the most abundant plant pigment, is most efficient in capturing red and blue light, and other lights are not absorbed by plants. So ideal light source for plants should illuminate lights in blue and red as the present device. High PLQY (>60%) ensures low energy consumption of the device. Broad FWHM (>35 nm) ensures the supply of all range of red light.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim at least the following:

1. A material for simultaneously generating white light and transmitting data, the material comprising:

halide perovskite nanocrystals that absorb a first light energy at a first wavelength and emit a second light energy at a second wavelength that is different from the first wavelength; and a phosphor mixed with the halide perovskite nanocrystals, the phosphor being configured to absorb the first light energy at the first wavelength and emit a third light energy at a third wavelength, that is different from the second wavelength, wherein a combination of the emitted second and third wavelengths and the first wavelength results in the white light, and a modulation of the first light energy is present in the generated white light.

2. The material of claim 1, wherein the halide perovskite nanocrystals are AMX$_3$, wherein A is a cation, M is Pb or Sn, and X is a halide.

3. The material of claim 2, wherein the cation comprises an methylammonium (MA), formamidinium (FA), cesium (Cs), or a combination thereof.

4. The material of claim 3, wherein the cation comprises a combination of at least two of MA, FA, and Cs.

5. The material of claim 1, wherein the halide perovskite nanocrystals are MAPbCl$_3$, MAPbBr$_3$, MAPbI$_3$, FAPbCl$_3$, FAPbBr$_3$, FAPbI$_3$, CsPbCl$_3$, CsPbBr$_3$, CsPbI$_3$, MASnCl$_3$, MASnBr$_3$, MASnI$_3$, FASnCl$_3$, FASnBr$_3$, FASnI$_3$, CsSnCl$_3$, CsSnBr$_3$, or CsSnI$_3$.

6. The material of claim 1, wherein the halide perovskite nanocrystals are (MA/FA)PbCl$_3$, (MA/FA)PbBr$_3$, (MA/FA)PbI$_3$, (MA/Cs)PbCl$_3$, (MA/Cs)PbBr$_3$, (MA/Cs)PbI$_3$, (FA/Cs)PbCl$_3$, (FA/Cs)PbBr$_3$, (FA/Cs)PbI$_3$, (MA/FA)SnCl$_3$, (MA/FA)SnBr$_3$, (MA/FA)SnI$_3$, (MA/Cs)SnCl$_3$, (MA/Cs)SnBr$_3$, (MA/Cs)SnI$_3$, (FA/Cs)SnCl$_3$, (FA/Cs)SnBr$_3$, (FA/Cs)SnI$_3$, (MA/FA/Cs)PbCl$_3$, (MA/FA/Cs)PbBr$_3$, (MA/FA/Cs)PbI$_3$, (MA/FA/Cs)SnCl$_3$, (MA/FA/Cs)SnBr$_3$, (MA/FA/Cs)SnI$_3$, (MA/FA/Cs)Pb(Cl/Br/I)$_3$, or (MA/FA/Cs)Sn(Cl/Br/I)$_3$.

7. The material of claim 1, wherein the halide perovskite nanocrystals are MAPbBr$_2$Cl.

8. The material of claim 1, wherein the halide perovskite nanocrystals are CsPbBr$_3$.

9. The material of claim 1, wherein the second light energy is green light.

10. The material of claim 1, wherein the second light energy has a Full Width at Half Maximum (FWHM) of less than 35 nanometers and a Photo Luminescence Quantum Yield (PLQY) of greater than 80%.

11. The material of claim 1, wherein the second wavelength has an emission peak wavelength of 510 nm to 540 nm.

12. A film for simultaneously generating white light and transmitting data, the film comprising:

a polymer;

a phosphor; and halide perovskite nanocrystals encapsulated together with the phosphor in the polymer, wherein the halide perovskite nanocrystals absorb a first light energy at a first wavelength and emit a second light energy at a second wavelength that is different from the first wavelength, the phosphor is configured to absorb the first light energy at the first wavelength and emit a third light energy at a third wavelength, that is different from the second wavelength, wherein a combination of the emitted second and third wavelengths and the first wavelength results in the white light, and a modulation of the first light energy is present in the generated white light.

13. The film of claim 12, wherein the halide perovskite nanocrystals are $AMX_3$, wherein A is a cation, M is Pb or Sn, and X is a halide.

14. The film of claim 12, wherein the cation comprises an methylammonium (MA), formamidinium (FA), cesium (Cs), or a combination thereof.

15. The film of claim 12, wherein the cation comprises a combination of at least two of MA, FA, and Cs.

16. The film of claim 12, wherein the halide perovskite nanocrystals absorb a first light energy at a first wavelength and emit a second light energy at a second wavelength that is different from the first wavelength, the second light energy being green light.

17. A film, comprising:
a polymer; and
$CsPbBr_3$ nanocrystals encapsulated in the polymer, the $CsPbBr_3$ nanocrystals absorb a first light energy at a first wavelength and emit a second light energy at a second wavelength that is different from the first wavelength, the second wavelength ranging from about 510 nanometers (nm) to 540 nm, the second light energy having a Full Width at Half Maximum (FWHM) of less than 35 nm and a Photo Luminescence Quantum Yield (PLQY) of greater than 80%.

18. The film of claim 17, wherein the polymer is a polyurethane, a rubber, polyvinylchloride (PVC), a vinyl polymer, a polyester, a polyacrylate, a polyamide, a biopolymer, a polyolefine, a thermoplastic elastomer, a styrene block copolymer, or a polyether block amid.

19. A device comprising a liquid crystal display (LCD) comprising the film of claim 17.

20. A device comprising a light emitting diode (LED) comprising the film of claim 17.

21. A lighting device comprising the film of claim 17.

* * * * *